United States Patent [19]

Branovich et al.

[11] Patent Number: 4,544,535

[45] Date of Patent: Oct. 1, 1985

[54] METHOD OR PREPARING NONLAMINATING ANISOTROPIC BORON NITRIDE

[75] Inventors: Louis E. Branovich, Howell Township, Monmouth County; Bernard Smith, Ocean; Gerard L. Freeman, Freehold Township, Monmouth County, all of N.J.

[73] Assignee: The United States of America as represented by the Secretary of the Army, Washington, D.C.

[21] Appl. No.: 715,215

[22] Filed: Mar. 22, 1985

[51] Int. Cl.$^4$ .............................................. C01B 21/06
[52] U.S. Cl. .................................................... 423/290
[58] Field of Search ......................................... 423/290

[56] References Cited

U.S. PATENT DOCUMENTS

| 3,152,006 | 10/1964 | Basche | 423/290 |
| 3,692,566 | 9/1972 | Branovich et al. | 423/290 |
| 4,096,297 | 6/1978 | Pappis et al. | 423/290 |
| 4,402,928 | 9/1983 | Shinko et al. | 423/290 |

Primary Examiner—John Doll
Assistant Examiner—Jackson Leeds
Attorney, Agent, or Firm—Anthony T. Lane; Jeremiah G. Murray; Roy E. Gordon

[57] ABSTRACT

Non laminating anisotropic boron nitride is prepared by reacting a boron trihalide with ammonia at a temperature of from 1100° C. to 1600° C. in the presence of a small amount of a volatile oxygen containing compound. The small amount of volatile oxygen containing compound is sufficient to prevent lamination yet small enough to prevent the finalized product from losing its anisotropy.

8 Claims, No Drawings

METHOD OR PREPARING NONLAMINATING ANISOTROPIC BORON NITRIDE

The invention described herein may be manufactured, used, and licensed by or for the Government for governmental purposes without the payment to us of any royalty thereon.

This invention relates in general to a method of preparing anisotropic boron nitride and in particular to a method of preparing nonlaminating anisotropic boron nitride.

BACKGROUND OF THE INVENTION

Anisotropic boron nitride is a form of boron nitride having unequal physical properties along different axes. In a large crystallite of anisotropic boron nitride, all the planes are parallel to each other. Lamination occurs because weak Vander Waals forces acting over long distances allow the planes to slide across each other causing lamination. The difficulty with the laminated boron nitride is its inability to form a strong bond and hold together. This obviates its use in such desireable applications as microwave and millimeter wave devices.

Heretofore, the undesirable laminated anisotropic boron nitride has been prepared in general by reacting a boron halide such as boron trichloride with ammonia according to the reaction:

$$BCl_3 + 4NH_3 \rightarrow BN + 3NH_4Cl$$

The reaction is non reversible, that is, no equilibrium exists between $BN + 3NH_4Cl$ with $BCl_3 + 4NH_3$. Heat is required in this reaction and the boron nitride is deposited on a hot substrate.

SUMMARY OF THE INVENTION

The general object of this invention is to provide a method of preparing non laminating anisotropic boron nitride. A further object is to provide such a method wherein the resulting non laminated anisotropic boron nitride will form a strong bond and hold together. A still further object of the invention is to provide such a method wherein the resulting non laminated anisotropic boron nitride will be suitable for use in microwave and millimeter wave devices.

It has now been found that the aforementioned objects can be attained by adding small amounts of a volatile oxygen containing compound such as alcohol, an oxygen containing boron compound, or water to the reaction of ammonia with the boron halide.

The amount of volatile oxygen containing compound added must be sufficient to prevent lamination yet small enough to prevent the finalized product from losing its anisotropy. The amount is less than 500 parts per million of reactants.

According to the method of the invention, the degree of anisotropy will be a function of the amount of volatile oxygen containing compound present. Similarly, the degree of lamination will also be a function of the amount of volatile oxygen containing compound added to the reaction.

DESCRIPTION OF THE PREFERRED EMBODIMENT

Non laminating anisotropic boron nitride is prepared by reacting ammonia with boron trichloride at a temperature of 1100° C. to 1600° C. according to the reaction:

$$BCl_3 + 4NH_3 \rightleftharpoons BN + 3NH_4Cl$$

in the presence of less than 500 parts per million of reactants of water. This amount of water is sufficient to prevent lamination yet small enough to prevent the finalized product from losing its anisotropy. When one adds the small amount of water or other volatile oxygen containing compound, the reaction takes on a small amount of reversibility as indicated in the latter reaction.

The resulting non laminating anisotropic boron nitride forms strong bonds, yet has enough anisotropy to be suited to microwave applications.

We wish it to be understood that we do not desire to be limited to the exact details as described for obvious modifications will occur to a person skilled in the art.

What is claimed is:

1. Method of preparing non laminating anisotropic boron nitride comprising reacting a boron trihalide with ammonia at a temperature of 1100° C. to 1600° C. in the presence of a small amount of a volatile oxygen containing compound, the small amount of volatile oxygen containing compounds being sufficient to prevent lamination yet small enough to prevent the finalized product from losing its anisotropy.

2. Method according to claim 1 wherein the boron trihalide is boron trichloride.

3. Method according to claim 1 wherein the volatile oxygen containing compound is selected from the group consisting of alcohol, an oxygen containing boron compound and water.

4. Method according to claim 3 wherein the volatile oxygen containing compound is alcohol.

5. Method according to claim 3 wherein the volatile oxygen containing compound is an oxygen containing boron compound.

6. Method according to claim 3 wherein the volatile oxygen containing compound is water.

7. Method of preparing non laminating anisotropic boron nitride comprising reacting boron trichloride with ammonia according to the reaction:

$$BCl_3 + 4NH_3 \rightleftharpoons BN + 3NH_4Cl$$

at a temperature of 1100° C. to 1600° C. in the presence of a small amount of water sufficient to prevent lamination yet small enough to prevent the finalized product from losing its anisotropy.

8. Method according to claim 7 wherein the amount of water is less than 500 parts per million of total reactants.

* * * * *